3,275,574
COORDINATION POLYMERS INVOLVING DOUBLY BRIDGED TRIVALENT OCTAHEDRAL METALS
Anthony J. Saraceno, Flourtown, Pa., assignor to Pennsalt Chemicals Corporation, Philadelphia, Pa., a corporation of Pennsylvania
No Drawing. Filed July 15, 1964, Ser. No. 382,924
18 Claims. (Cl. 260—2)

This application is a continuation-in-part of Serial No. 269,748, filed April 1, 1963, and now abandoned.

This invention relates to novel coordination polymers and more particularly is concerned with novel polymers and copolymers involving a doubly bridged (catenated) trivalent octahedral metal coordinated with two unidentate ligands, whereby the polymer backbone and the coordinated groups are entirely inorganic. These novel polymers and copolymers have unexpectedly high temperature stability and are useful for fabricated articles and as coating compositions to be employed under high temperature conditions.

In accord with the invention polymers and copolymers are now provided which have the repeating units $M(a)(b)X_2$ wherein M is a trivalent octahedral metal, $a$ is a unidentate ligand having a charge of minus one (that is, it is a negative monovalent ion), $b$ is a neutral unidentate ligand, and X is a bridging group also with a charge of minus one. Alternatively, these solid polymers may be represented as compounds containing a plurality of the following recurring units:

wherein M, $a$, $b$ and X are defined above and the repeating units may be the same (homopolymers) or different (copolymers).

The trivalent octahedral metal M may be any of the numerous metals characterized by having a relatively unstable +2 valence which can be oxidized to the stable trivalent oxidation state and has in its trivalent state a coordination number of six (i.e. an octahedral spatial configuration). By a relatively unstable +2 valence state is meant that the metal in its divalent state as its simple salts is capable of being oxidized to its trivalent state by air at ambient temperature and at atmospheric pressure. Such metals will include those metals selected from the group consisting of chromium, iron, ruthenium, europium and ytterbium.

The catenating or bridging group (X in the above formula of the polymers) will have a charge of minus one and will comprise the anion of an acid. Preferably, the acid will be one having the structure $R_2M'(O)OH$ which is based on a group of metals and metalloids of group VB; that is, M' is an element of group VB having an atomic number greater than seven (e.g. phosphorus, arsenic, antimony and bismuth). M' is preferably phosphorus and the preferred bridging groups are the anions of phosphinic acids. Many of these acids are disclosed by Kosolapoff in his book "Organophosphorus Compounds" (John Wiley, 1950). It is evident that for the purpose of forming the polymer backbone by bridging the octahedral metal M atoms, only three valences of the M' atom in each of the bridging groups are used. Thus the remaining valences of the M' atom are satisfied with the two R groups as shown above in the acid formula $R_2M'(O)OH$. These R groups may be the same or different inert organic groups such as alkyl, aryl, alkoxy or aryloxy radicals. Preferably R will be a hydrocarbon alkyl or aryl group containing from one to ten carbon atoms such as, for example, methyl, ethyl, t-butyl, hexyl, octyl, phenyl, tolyl, xylyl, naphthyl and the like. It will also be understood that the two bridging groups need not be the same.

The unidentate ligand $a$, which will have a charge of minus one, will be a negative inorganic group such as hydroxyl, nitrate, cyanate, thiocyanate, cyanide, halide, etc. The unidentate ligand $b$ is a neutral molecule such as water, ammonia, etc. The unidentate ligands $a$ and $b$ will be bonded to the trivalent octahedral metal and these ligands in combination serve to complete the coordination number of six and to give a polymer which is electrically neutral.

The process by which the novel polymers of this invention are prepared involves a two-step reaction. In the first step one mole of a salt of the metal M in its divalent form is reacted with two moles of the anion $R_2M'(O)O^-$. The salt of the metal M generally has limited water solubility and for this reason the reaction is carried out either as an aqueous slurry or dispersion or in an aqueous alcoholic medium where the metal salt is more or less soluble. In some instances the reaction is also carried out in an essentially anhydrous system comprising an organic solvent such as an alcohol (e.g. methanol, ethanol and the like). Thus, for example, where the metal is chromium (II) the chromous salt is slurried in water or in an aqueous alcoholic medium. With a ferrous salt, however, an essentially anhydrous system is required and a slurry of the salt in an ethanol (absolute or 95%) and isopropanol mixture is most preferable. After the divalent metal salt and the anion of the acid $R_2M'(O)OH$ are reacted in the first step, the intermediate product, which is believed to be a polymeric material where M is in the divalent form, is then oxidized in the second step and this is done in the presence of the neutral and univalent ligands. It is not necessary to isolate the intermediate polymer, but the oxidation may be carried out in the reaction system of the first step of the process.

The following steps illustrate the method:

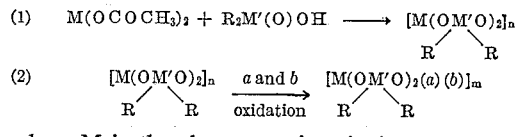

where M in the above equations is the metal capable of existing in the divalent and trivalent states, $R_2M'(O)OH$ is the acid whose anion becomes the bridging group, $a$ is the univalent ligand and $b$ is the neutral ligand. The oxidation step results in coordination of the two new groups and, as indicated, the polymers comprise an octahedral metal having a completely inorganic backbone wherein the coordinated groups are entirely inorganic. In Equation 2 above, $a$ is the negative monovalent ion as defined above and results from the oxidation system and $b$ is the neutral ligand obtained from water, ammonia, etc.

The divalent metal salt which will be used (shown as the acetate in step 1 above) may be any salt having a greater solubility in the reaction medium than does the intermediate formed in step 1. Such salts include the chloride, nitrate, perchlorate, acetate and the like. In general, however, the acetate and chloride will be preferred because of their ready availability. Specific starting salts will include chromous acetate, chromous chloride, ferrous sulfate, ferrous acetate, ruthenium dichloride, europous chloride, ytterbium dichloride, and the like. In carrying out step 1 with the divalent metal salt the process proceeds under neutral or acid conditions. Thus, for example, the reaction may be carried out in the presence of an alkali or alkaline earth metal salt of the acid, or the free acid of the catenating acid group may be employed. It has been found that when potassium hydroxide is used in the reaction mass so that the potassium salt of the catenating acid is employed, a polymeric product is obtained which has a somewhat higher intrinsic viscosity than that obtained with the sodium salt.

The oxidant used in the process may be any conventional oxidant such as oxygen, NO, $NO_2$, hydrogen perchloride, chlorine, bromine, tetracyanomercurate ion (which can be made in situ by reaction of KCN with mercuric cyanide) and the like, but in general the oxygen in air will be used. Alternatively, chloride ion may be introduced by use of KCl and $HgCl_2$; nitrate ligands introduced by use of $KNO_3$ and $Hg(NO_3)_2$; thiocyanate ligands may be introduced into the polymer by using thiocyanogen chloride or ceric thiocyanate as oxidizer; cyanate is introduced with ceric cyanate; and other ligands are introduced by comparable methods.

In carrying out the process for obtaining the polymers of this invention, it is frequently desired, where high molecular weight products are wanted, to employ reagents of the highest purity. The use of purified reagents results in products of extremely high intrinsic viscosity frequently exceeding 0.60.

The invention includes copolymers and the process for making them. Copolymers are obtained by carrying out the first step of the process with a mixture of bridging acids. Alternatively, copolymers can be obtained by oxidizing a mixture of different reaction products previously obtained in the first step. Still another type of copolymer embodied by the invention is that obtained by carrying out the oxidation with more than one oxidant which results in repeating units having different ligands in the polymer. Copolymers wherein the metal entity differs are also contemplated by the invention, as, for example, a polymer obtained by using a mixture of chromous acetate and ferrous acetate as the divalent metal reactants.

The compounds of this invention have properties which are typical of high polymers. They swell extensively in benzene or in chloroform to give highly viscous solutions which form transparent films and fibers. Films of the polymers plasticized with agents such as tricresyl phosphate and chlorinated polyphenyls have tensile strengths in the range of 100 to above 3000 p.s.i. and show excellent cohesiveness and flexibility. The fibers require no plasticization, being flexible and cohesive at room temperature. Rubbery gels have also been obtained which retain elastomeric properties under the plasticizing influence of solvents. A particularly surprising property of these polymers is their high thermal stability in that no melting of the polymers is observed up to temperatures of 400° C. and, in fact, even after heating fabricated parts to 700° C. the parts still retain structural strength. This is surprising in view of the fact that the coordinated groups are those which by nature are removed from the polymer upon heating, e.g., the elimination of water. The polymer after heating, however, retains its shape and has increased rigidity.

Because of the properties of these polymers they will find numerous and varied uses. For example, they can be fabricated into films and fibers which will show excellent thermal stability. By compression molding with or without plasticization various shaped articles may be fabricated which will have structural strength and stability at high temperatures above those of conventional organic polymers. The organic solvent solutions such as benzene solutions which are viscous will have value as thickeners in rubber or oil additives and as viscosity stabilizers. The polymers may be used specifically for coatings, for gaskets and ring seals and the like.

EXAMPLES 1 TO 5

Preparation of 

Reaction equations:

(a)
$Cr(OCOCH_3)_2 \cdot H_2O + 2(C_6H_5)_2P(O)OH + 2NaOH \longrightarrow$ $$1/x[Cr(O=\underset{\underset{C_6H_5}{|}}{\overset{\overset{C_6H_5}{|}}{P}}-O)_3]_x + 2NaOCOCH_3 + 3H_2O$$

(b)
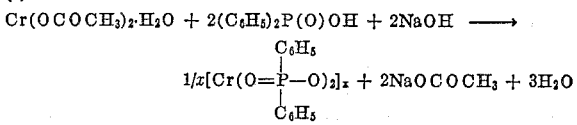

Freshly prepared $Cr(OCOCH_3)_2 \cdot xH_2O$ is suspended with stirring in water and an excess or stoichiometric quantity of diphenylphosphinic acid, $(C_6H_5)_2P(O)OH$, neutralized with 0.986 M NaOH and deoxygenated by purging with $N_2$, is added under air-free conditions ($N_2$ atmosphere). The reaction mixture is heated to refluxing temperature (100° C.) and after several hours (½ to 48 hours) the mixture is cooled and air is slowly allowed to diffuse into the reaction mixture. After oxidation is complete (indicated by the absence of any pink or violet coloration), the product is recovered by filtering, washed with $H_2O$ and dried at 100° C. It is purified by dissolving in chloroform or benzene, filtering and evaporating the solution on a steam bath under a current of nitrogen. Solutions of the material in benzene or chloroform display intrinsic viscosities of 0.1 and higher and fractional extraction proves that the polymer has a distribution of molecular weight.

Table I shows examples of five runs with pertinent data. Initial weight loss for $$[Cr(OH)(H_2O)(O=\underset{\underset{C_6H_5}{|}}{\overset{\overset{C_6H_5}{|}}{P}}-O)_2]_n$$

from thermogravimetric analysis is at 390° C. with a step occurring at 420–430° C. possibly corresponding to dehydration.

The polymers swell extensively in chloroform and dissolve only very slowly with time. They were fabricated into flexible films as follows:

About 0.25 g. of the polymer was dissolved in 10 ml. of benzene and enough tricresyl phosphate was added to give a 30% to 45% by weight solution of plasticizer. The mixture was thoroughly stirred and poured into an aluminum casting dish coated lightly with a mold lubricant to prevent adhesion. After slow evaporation of the benzene, a transparent film was deposited which was stripped off the casting dish.

A chlorinated polyphenyl plasticizer may be substituted for tricresyl phosphate in which case no mold lubricant is required.

The properties of the films deposited depend upon the intrinsic viscosity of the polymer and concentration of plasticizer. For example, for an intrinsic viscosity of 0.21 and 35% plasticizer content a tensile strength of 375 p.s.i. was obtained, whereas for an intrinsic viscosity of 0.40 a value of 750 p.s.i. was obtained with the same level of plasticizer.

Fibers were obtained by dipping a rod in a concentrated solution (about 30%) of the polymer in chloroform and pulling. The fibers obtained were clear, green, flexible fibers having good thermal stability.

TABLE I.—REACTION CONDITIONS FOR POLYMERIZATION

| Example No. | Cr(OCOCH₃)₂·H₂O | (C⁶H⁵)₂P(O)OH | Reaction Time | Other Conditions | Intrinsic Viscosity |
|---|---|---|---|---|---|
| 1 | 515 g | 27.8 g | ½ hr | Room temp. dry oxid.[1] | 0.16 |
| 2 | 5.5 g | 20.0 g | ½ hr | Room temp. oxid. in H₂O | 0.08 |
| 3 [2] | 5.5 g | 20.0 g | 48 hr | 100°, oxid. in H₂O | 0.29 |
| 4 | 2.7 g | 13.9 g | 5 hr | do | 0.15 |
| 5 | 5.5 g | 20.0 g | 5 hr | do | 0.14 |

[1] The intermediate polymer, where chromium is divalent, was first isolated by filtration in an inert atmosphere and then allowed to be oxidized by introduction of air.
[2] KOH used instead of NaOH.

Analysis of polymer $[Cr(OH)(H_2O)(O=P(C_6H_5)_2-O)_2]_n$:

| Calculated | Percent | Example 1 | Example 2 | Example 3 | Example 4 | Example 5 |
|---|---|---|---|---|---|---|
| 10.01 | Cr | 9.7 | 9.3 | 10.2 | 9.6 | 9.9 |
| 11.88 | P | 11.50 | 11.13 | 11.91 | 12.12 | 11.71 |
| 55.25 | C | 56.88 | 54.91 | | 55.53 | 55.28 |
| 4.43 | H | 4.37 | 4.89 | | 4.18 | 4.25 |
| No. Av. Mol Wt | | 13,800 | 6,600 | >10,000 | >10,000 | 4,740 |

EXAMPLES 6 TO 8

To a freshly prepared suspension of $$Cr(OCOCH_3)_2 \cdot H_2O$$

in ethanol was added a stoichiometric amount of $$(CH_3)(C_6H_5)P(O)OH$$

under air-free conditions (N₂ atmosphere) at room temperature. After stirring for ½ to 2 hours the pressure was reduced and the excess ethanol and acetic acid were removed by distillation at room temperature. Air (undried) was allowed to diffuse slowly to the reaction mixture, and the resultant product was washed with water and dried at 100° C. The products prepared in this manner have high molecular weights as deduced from ebulliometry and viscosity measurements. Table II gives the data obtained:

TABLE II

| Example No. | Cr(OCOCH₃)₂·H₂O | CH₃C₆H₅P(O)OH | Reaction Time | Other Conditions | Intrinsic Viscosity |
|---|---|---|---|---|---|
| 6 | 2.7 g | 4.15 g | 39 min | Room temp. overnight pumping [1] | 0.11 |
| 7 | 2.7 g | 4.15 g | 120 min | Room temp. open to air | 0.25 |
| 8 | 2.7 g | 4.15 g | 123 min | Room temp. overnight pumping | 0.33 |

[1] Held at 10 mm. pressure for 17 hours.

Analysis of polymer $[Cr(OH)(H_2O)(O=P(CH_3)(C_6H_5)-O)_2]_n$:

| Calculated | Percent | Example 6 | Example 7 | Example 8 |
|---|---|---|---|---|
| 13.09 | Cr | 13.6 | 13.8 | 13.3 |
| 15.61 | P | 14.15 | 13.63 | 13.76 |
| 42.32 | C | 42.05 | 41.94 | 41.00 |
| 4.82 | H | 4.35 | 4.34 | 4.29 |
| Mol. Wt | | 5,300 | >12,100 | >15,900 |

The properties of the polymers of Examples 6 to 8 are similar to those of Examples 1 to 5.

EXAMPLE 9

*Preparation of copolymer*

Following the details of the above examples, 2.7 g. of chromous acetate monohydrate, 2.2 g. of diphenylphosphinic acid and 5.7 g. of methylphenylphosphinic acid were refluxed in water at 100° C. for 18 hours and then oxidized with air. The product polymer is a green solid and has an intrinsic viscosity of 0.14.

Calculated/found for 1:1 polymer on basis of $$[Cr(OH)(H_2O)(O=P(C_6H_5)_2-O)(O=P(CH_3)(C_6H_5)-O)]_n$$

Percent Cr, 11.37/11.7; percent P, 13.46/13.60; percent C, 49.6/49.2; percent H, 4.63/5.20.

EXAMPLE 10

*Use of more than one oxidizer*

The polymer corresponding to $$[Cr(O=P(C_6H_5)_2-O)_2]_x$$

is prepared as in Example 3 and the polymer oxidized with nitrogen dioxide followed by oxygen. The dark green, solid polymer was soluble in chloroform and benzene. The analysis of the polymer follows:

Calculated/found for 1:1 copolymer corresponding to $$\{[Cr(OH)(H_2O)(O=P(C_6H_5)_2-O)_2]-[Cr(NO_2)(H_2O)(O=P(C_6H_5)_2-O)_2]\}_n$$

Percent Cr, 9.7/9.2; percent P, 11.56/11.26; percent C, 53.7/53.3; percent H, 4.2/4.0; percent N, 1.31/1.53.

EXAMPLE 11

Example 10 is repeated except that the oxidizing agents are nitric oxide and oxygen. The copolymer obtained is similar to that obtained in Example 10. Analysis for the copolymer is as follows.

Calc./found for $$\{[Cr(OH)(H_2O)(O=P(C_6H_5)_2-O)_2]_3-[Cr(NO)(H_2O)(O=P(C_6H_5)_2-O)_2]\}$$

Percent Cr, 9.33/10.1; percent P, 11.8/11.1; percent C, 55.1/55.6; percent H, 4.36/4.58; percent N, 0.67/0.81.

EXAMPLE 12

A white precipitate was obtained by the reaction under nitrogen of 2 g. of ferrous acetate with 2.6 g. of diphenylphosphinic acid in 50 ml. of an equal-volume mixture of ethanol and isopropanol. The white precipitate, after being separated by filtration, was exposed to the atmosphere for oxidation. It turned a pale chocolate color during the oxidation. The yield of $$[Fe(OH)(H_2O)(OP(C_6H_5)_2O)_2]_x$$

is almost quantitive.

Calculated/found for $$[Fe(OH)(H_2O)(OP(C_6H_5)_2O)_2]_x$$

Percent C, 55.0/55.1; percent H, 4.4/4.4; percent Fe, 10.6/10.1; percent P, 11.8/11.9; percent $H_2O$, 3.4/5.0.

EXAMPLE 13

Repetition of Example 12 with 1.8 g. of phenylmethylphosphinic acid instead of the 2.6 g. of diphenylphosphinic acid gave an almost quantitative yield of $$[Fe(OH)(H_2O)(OP(C_6H_5)(CH_3)(O)_2]_x$$

which is also a pale chocolate colored solid.

*Analysis.*—Calculated/found: Percent C, 42.10/41.45; percent H, 4.55/4.42; percent Fe, 14.0/14.1; percent P, 15.5/15.7; percent $H_2O$, 4.5/4.2.

EXAMPLE 14

A solution of 2.7 g. (0.0195 mole) of dimethylarsinic acid in 50 ml. of deoxygenated ethanol (obtained by bubbling nitrogen through it for 30 minutes) was added to a suspension of 1.84 g. (0.0098 mole) of chromous acetate monohydrate in 100 ml. of deoxygenated ethanol. The reaction mixture, which immediately turned maroon to deep purple, was stirred at room temperature for about two hours. The reaction vessel was then evacuated to remove ethanol and acetic acid. Pumping was continued for 18 hours while air was allowed to leak slowly into the system. The reaction mixture, which had become green, was dissolved in chloroform, filtered, and the filtrate evaporated to dryness on a steam bath. The residue was then taken to constant weight at 105° C. During the drying process the odor of acetic acid was detected, and the intrinsic viscosity increased from 0.037 to 0.124. This polymer, which has a $$—Cr—(O—As—O—)_2$$

type of backbone, swells extensively in chloroform. Films, coatings and fibers may be fabricated from chloroform solution with or without plasticization. Cast films containing 45% of chlorinated polyphenyls as plasticizer ("Aroclor" 1254) adhere to metal surfaces, forming a flexible coating. The polymer thus may be used as an insulator, sealer or dielectric.

In like manner, ruthenium, europium and ytterbium salts are reacted with diphenylphosphinic acid to yield polymers similar to those described in the above examples. Instead of using phosphinic and arsinic acids, the analogous acid of antimony may be employed with equivalent results.

EXAMPLE 15

*High intrinsic viscosity polymer*

After neutralizing 8 g. of $(C_6H_5)_2P(O)OH$ with 1 M KOH, $N_2$ is bubbled into the solution to remove dissolved oxygen. This KOH neutralized solution is added under air-free conditions to an aqueous suspension of 2.7 g. of freshly prepared $Cr(OCOCH_3)_2 \cdot xH_2O$ which had been held under reflux for one hour. The resulting pink precipitate, the intermediate polymer $$[Cr(OP(C_6H_5)_2O)_2]_n$$

is filtered after 1½ hours of additional heating, and is twice washed under nitrogen. The intermediate polymer is then slurried into $H_2O$ (5 g./600 ml.) and then is opened to the atmosphere for slow oxidation via air diffusion. After oxidation is complete, the product is recovered by filtering, washing with $H_2O$ and drying at 100° C. It is purified by dissolving in benzene, filtering and evaporating the solution under a current of $N_2$ at room temperature to give a green glassy solid. Intrinsic viscosity of the polymer prepared in this manner is 0.61.

A method for making polymers of still higher intrinsic viscosity follows:

Approximately 2.5 g. of freshly prepared $$Cr(OCOCH_3)_2 \cdot H_2O$$

is suspended in 250 ml. of deoxygenated water, and the mixture is heated to refluxing temperature with magnetic stirring for 1 hour under a blanket of $N_2$. A solution of $$(C_6H_5)_2P(O)OK$$

prepared by neutralizing 7.45 g. of $(C_6H_5)_2P(O)OH$ with aqueous KOH, is purged with $N_2$ and added to the chromium acetate suspension. Heating and stirring are continued for an additional 5 minutes, and the reaction is allowed to cool. The pale-colored precipitate is filtered under $N_2$ and then washed with four 100 ml. portions of deoxygenated water. This washing step results in a purer intermediate polymer which is believed to contributed to higher intrinsic viscosity polymers. The washed solid is then oxidized by dispersing it in 250 ml. of $H_2O$ while blowing a stream of air through the $H_2O$ suspension which is maintained at 90°. The oxidized product is filtered, washed with water and dried at 100°. To remove the insolubles from the polymer, 300 ml. of benzene is added to dissolve as much of the polymer as possible and the resulting green solution is then filtered. Evaporation at room temperature followed by drying at 120° C. leaves a glassy, dark green, resin of $$[Cr(H_2O)(OH)(OP(C_6H_5)_2O)_2]_x$$

having an intrinsic viscosity of about 0.7. *Analysis.*—Calculated/found: Percent Cr, 10.0/9.7; Percent P, 11.88/11.78; Percent C, 55.25/55.93; Percent H, 4.43/4.65. Infrared spectra show the presence of OH (hydroxyl absorption) and $OH_2$ (coordinated $H_2O$) absorption at 3590 and ~3300–3400 cm.$^{-1}$ respectively. The polymer was polymerized further by holding its 1% solution in chloroform at 54° C. for 10 days after which time its intrinsic viscosity increased to 1.5.

EXAMPLE 16

*Use of free acid $(C_6H_5)_2P(O)OH$*

1.88 g. of $Cr(OCOCH_3)_2 \cdot H_2O$ is placed in 175 ml. of deoxygenated $H_2O$. To this is added 4.36 g. of $$(C_6H_5)_2P(O)OH$$

The mixture is refluxed for two hours after which the reaction vessel is set up for atmospheric distillation and 155 ml. (mixture of $H_2O$ and $CH_3COOH$) is collected. An extra 175 ml. of deoxygenated $H_2O$ is then added and the distillation is repeated. This operation is performed a third time after which the odor of acetic acid in the distillate is very faint. The reaction mixture is then exposed to air in an aqueous slurry for oxidation to Cr (III). The solid is recovered and purified in the usual manner. The intrinsic viscosity is 0.18 and the number average molecular weight is above 10,000 from ebulliometry in $CHCl_3$. *Analysis.*—Calculated/found: Percent Cr 10.01/9.5; Percent P, 11.88/12.29.

EXAMPLE 17

1.8 g. of chromous acetate monohydrate was suspended in 100 ml. $H_2O$ under a nitrogen atmosphere and a deoxygenated solution of 6.7 g. of diphenylphosphinic acid neutralized with 1 N KOH was added. The mixture was brought to refluxing temperature and maintained with stirring for 22 hours. The precipitated chromium (II)

intermediate was then isolated by filtration and washed with water, all operations being conducted under nitrogen. A mixture of 7.3 g. of Hg(CN)₂ and 3.8 g. of KCN in 50 ml. of H₂O was then deoxygenated and added to an aqueous suspension of the chromous diphenylphosphinate. The reaction mass was stirred at room temperature for two hours and was then exposed to air. The mixture was filtered, washed with H₂O, and dried at 105° C. The green solid was then extracted with benzene to give a fraction which corresponds to a 1:1 copolymer with respect to CN and OH liquids. The intrinsic viscosity of the material is above 0.3 indicating its polymeric nature. *Analysis.*—Calculated/found for

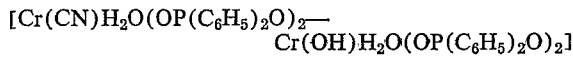

Percent N, 1.32/1.16.

It will be understood that numerous variations may be made from the above without departing from the spirit and scope of the invention.

I claim:
1. A polymer having an inorganic backbone consisting of a doubly bridged, trivalent, octahedral metal coordinated with two unidentate ligands wherein each of said bridging groups is the anion of an acid R₂M'(O)OH where R is alkyl, aryl, alkyloxy or aryloxy, M' is an element selected from group VB having an atomic number greater than 7, and wherein one of said unidentate ligands is a negative monovalent ion and the second unidentate ligand is a neutral molecule selected from the group consisting of water and ammonia.

2. The polymer of claim 1 wherein the octahedral metal is chromium.

3. The polymer of claim 1 wherein the octahedral metal is iron.

4. The polymer of claim 1 wherein M' is arsenic.

5. The polymer of claim 1 wherein M' is phosphorus.

6. A polymer having an inroganic backbone consisting of a doubly bridged chromium atom coordinated with a unidentate ligand which is a negative monovalent ion and a second unidentate ligand which is a neutral molecule selected from the group consisting of water and ammonia, said bridging groups consisting of the anion of R₂P(O)OH where R is a member of the group consisting of hydrocarbon alkyl and aryl radicals containing from one to ten carbon atoms.

7. A polymer as in claim 6 wherein the negative monovalent unidentate ligand is a hydroxyl group.

8. A polymer as in claim 6 wherein the neutral unidentate ligand is a water molecule.

9. A polymer having an inorganic backbone consisting of a doubly bridged chromium atom coordinated with water and a hydroxyl group, said bridging group consisting of the anion of dimethylphosphinic acid.

10. A polymer having an inorganic backbone consisting of a doubly bridged chromium atom coordinated with water and a hydroxyl group, said bridging group consisting of the anion of diphenylphosphinic acid.

11. A polymer having an inorganic backbone consisting of a doubly bridged chromium atom coordinated with water and a hydroxyl group, said bridging group consisting of the anion of methylphenylphosphinic acid.

12. A polymer as in claim 1 wherein the bridging groups are the same.

13. A polymer as in claim 1 wherein the bridging groups are different.

14. The process of reacting a divalent metal salt having a coordination number of six in its trivalent state with an acid anion of structure R₂M'(O)O⁻ where R is a member of the group consisting of hydrocarbon alkyl and aryl containing from one to ten carbon atoms, and M' is an element selected from group VB having an atomic number greater than seven and thereafter oxidizing the metal in the product to the trivalent oxidation state, said oxidation occurring in the presence of a neutral ligand selected from the group consisting of water and ammonia and a univalent ligand.

15. The process of claim 14 wherein the divalent metal is chromium, the acid is dimethylphosphinic acid, the neutral ligand is water and the univalent ligand is hydroxyl.

16. The process of claim 14 wherein the divalent metal is chromium, the acid is methylphenylphosphinic acid, the neutral ligand is water and the univalent ligand is hydroxyl.

17. The process of claim 14 wherein the divalent metal is chromium, the acid is diphenylphosphinic acid, the neutral ligand is water and the univalent ligand is hydroxyl.

18. The process of claim 14 wherein the acid anion is in the form of its potassium salt.

References Cited by the Examiner

UNITED STATES PATENTS 3,197,436   7/1965   Block et al. _____ 260—2

OTHER REFERENCES

Baumgaertel: "Zeitschrift fuer Anorganische und Allgemeine Chemie," volume 307 (1961), pp. 265–275.

Podall et al.: "Journal of Polymer Science," Part B, vol. 1, September 1963, pp. 457–459.

Saraceno et al.: "Jour. American Chem. Soc.," vol. 85, July 1963, pp. 2018–2019.

SAMUEL H. BLECH, *Primary Examiner.*

UNITED STATES PATENT OFFICE

CERTIFICATE OF CORRECTION

Patent No. 3,275,574 September 27, 1966

Anthony J. Saraceno

It is hereby certified that error appears in the above numbered patent requiring correction and that the said Letters Patent should read as corrected below.

Column 3, line 19, for "chloride" read -- oxide --; column 5, line 30, for "$Cr(OCOCH_3)_2 \cdot H_2O$" read -- $Cr(OCOCH_3)_2 xH_2O$ --; column 5, footnote to TABLE II, for "17 hours" read -- 18 hours --; column 9, line 38, for "inroganic" read -- inorganic --.

Signed and sealed this 22nd day of August 1967.

(SEAL)
Attest:

ERNEST W. SWIDER
Attesting Officer

EDWARD J. BRENNER
Commissioner of Patents

UNITED STATES PATENT OFFICE

CERTIFICATE OF CORRECTION

Patent No. 3,275,574                                              September 27, 1966

Anthony J. Saraceno

It is hereby certified that error appears in the above numbered patent requiring correction and that the said Letters Patent should read as corrected below.

Column 3, line 19, for "chloride" read -- oxide --; column 5, line 30, for "$Cr(OCOCH_3)_2 \cdot H_2O$" read -- $Cr(OCOCH_3)_2 xH_2O$ --; column 5, footnote to TABLE II, for "17 hours" read -- 18 hours --; column 9, line 38, for "inroganic" read -- inorganic --.

Signed and sealed this 22nd day of August 1967.

(SEAL)
Attest:

ERNEST W. SWIDER                                            EDWARD J. BRENNER
Attesting Officer                                               Commissioner of Patents